(12) United States Patent
Chehanowitz et al.

(10) Patent No.: US 11,748,770 B1
(45) Date of Patent: Sep. 5, 2023

(54) SYSTEM, METHOD, AND COMPUTER PROGRAM FOR USING SHARED CUSTOMER DATA AND ARTIFICIAL INTELLIGENCE TO PREDICT CUSTOMER CLASSIFICATIONS

(71) Applicant: Amdocs Development Limited, Limassol (CY)

(72) Inventors: Sarit Chehanowitz, Tel Aviv (IL); Liat Taub Bahar, Kfar Sabba (IL); Shmuel Ur, Shorashim (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 274 days.

(21) Appl. No.: 16/835,010

(22) Filed: Mar. 30, 2020

(51) Int. Cl.
*G06Q 30/0201* (2023.01)
*G06F 16/906* (2019.01)
*G06F 16/9536* (2019.01)

(52) U.S. Cl.
CPC ....... *G06Q 30/0201* (2013.01); *G06F 16/906* (2019.01); *G06F 16/9536* (2019.01)

(58) Field of Classification Search
None
See application file for complete search history.

(56) References Cited

U.S. PATENT DOCUMENTS

| | | | |
|---|---|---|---|
| 6,772,180 B1 | 8/2004 | Li et al. | |
| 9,864,951 B1 * | 1/2018 | Makhijani | G06Q 30/0282 |
| 10,747,761 B2 * | 8/2020 | Zhong | G06N 3/08 |
| 10,949,404 B2 * | 3/2021 | Suehs | G06F 16/211 |
| 2010/0150393 A1 | 6/2010 | Ni et al. | |
| 2011/0082824 A1 | 4/2011 | Allison et al. | |
| 2013/0097664 A1 * | 4/2013 | Herz | G06F 16/337 726/1 |
| 2014/0297363 A1 * | 10/2014 | Vemana | G06Q 30/0269 705/7.29 |
| 2018/0032938 A1 * | 2/2018 | Scriffignano | G06Q 10/0635 |

(Continued)

FOREIGN PATENT DOCUMENTS

CA 2884613 A1 * 3/2014 ............. G06Q 50/24

OTHER PUBLICATIONS

Sankaran, Empowering Consumer Research with Data Science (Year: 2019).*

(Continued)

*Primary Examiner* — Mohamed N El-Bathy
(74) *Attorney, Agent, or Firm* — Zilka-Kotab, P.C.

(57) ABSTRACT

As described herein, a system, method, and computer program are provided for using shared customer data and artificial intelligence to predict customer classifications. A first system of a first business entity receives an artificial intelligence model generated using output of a secure multi-party computation applied to: a first schema of first customer data stored by the first system, and a second schema of second customer data stored by a second system of a second business entity. Additionally, the first system executes the artificial intelligence model on the first customer data stored by the first system to generate a predictor, the predictor configured to receive input and process the input to predict a classification for the input. Further, the first system distributes the predictor for use by the second system of the second business entity to predict at least one classification for the second customer data.

6 Claims, 7 Drawing Sheets

(56) References Cited

U.S. PATENT DOCUMENTS

| | | | | |
|---|---|---|---|---|
| 2019/0066130 | A1* | 2/2019 | Shen | G06N 3/0454 |
| 2019/0318262 | A1* | 10/2019 | Meinders | G06N 20/00 |
| 2019/0347668 | A1* | 11/2019 | Williams | G06N 5/046 |
| 2019/0378599 | A1* | 12/2019 | Amisano | G06F 16/951 |
| 2020/0396063 | A1* | 12/2020 | Veeningen | G06F 17/17 |
| 2021/0241292 | A1* | 8/2021 | Pandey | G06N 3/08 |
| 2021/0273784 | A1* | 9/2021 | Gryb | H04L 9/0861 |

OTHER PUBLICATIONS

Saldiver et al., Attribute identification and predictive customisation using fuzzy clustering and genetic search for Industry 4.0 environments (Year: 2016).*

Chaisuwan et al., Intelligent Credit Service Risk Predicting System Based on Customer's Behavior By Using Machine Learning (Year: 2019).*

Macedo et al., A Practical Framework for Privacy-Preserving NoSQL Databases (Year: 2017).*

Inan et al., "Privacy Preserving Clustering On Horizontally Partitioned Data," PDM, 2006, 35 pages.

Maradithaya et al., "Semantically Secure Classifiers for Privacy Preserving Data Mining," Security and Privacy Management, Techniques, and Protocols, Chapter 3, Mar. 2018, 9 pages.

Sumana et al., Privacy Preserving Naïve Bayesian Classifier For Horizontal Partitioned Data, International Journal of Electronics and Electrical Engineering vol. 2, No. 1, Mar. 2014, pp. 21-25.

Ben-David et al., "A theory of learning from different domains," Machine Learning, vol. 79., 2010, pp. 151-175.

Kou et al., "Evaluation of Classification Algorithms Using MCDM and Rank Correlation," International Journal of Information Technology & Decision Making, vol. 11, No. 1, 2012, pp. 197-225.

Wikipedia, "Secure multi-party computation," Wikipedia, 2020, 11 pages, retrieved on Mar. 30, 2020, from https://en.wikipedia.org/wiki/Secure_multi-party_computation.

Vaidya et al., "Privacy-preserving SVM classification," Knowledge and Information Systems, vol. 14, 2008, pp. 161-178.

* cited by examiner

SYSTEM, METHOD, AND COMPUTER PROGRAM FOR USING SHARED CUSTOMER DATA AND ARTIFICIAL INTELLIGENCE TO PREDICT CUSTOMER CLASSIFICATIONS

FIELD OF THE INVENTION

The present invention relates to processing customer data, and more particularly to processing customer data to generate customer classifications.

BACKGROUND

Business entities typically store significant amounts of data on their customers. The data stored for each customer by a business entity can include demographic information as well as proprietary information generated for the customer by the business entity. The data stored for a customer by a business entity can be used by that same business entity for making business decisions and performing business-related activities, such as for targeted advertising purposes, targeted promotions purposes, improving customer service, among other purposes.

Due to privacy regulations and/or privacy concerns, business entities are limited in their ability to share, or even entirely prohibited from sharing, customer data with one another. However, one business entity may benefit from access to another business entity's customer data, for example by enriching their customer data information base from which the business entity can make business decisions. Thus, it may be desirable to share customer data between business entities while ensuring customer privacy.

There is thus a need for addressing these and/or other issues associated with the prior art.

SUMMARY

As described herein, a system, method, and computer program are provided for using shared customer data and artificial intelligence to predict customer classifications. In one embodiment, a first system of a first business entity receives an artificial intelligence model generated using output of a secure multi-party computation applied to: a first schema of first customer data stored by the first system of the first business entity, and a second schema of second customer data stored by a second system of a second business entity. Additionally, the first system of the first business entity executes the artificial intelligence model on the first customer data stored by the first system to generate a predictor, the predictor configured to receive input and process the input to predict a classification for the input. Further, the first system of the first business entity distributes the predictor for use by the second system of the second business entity to predict at least one classification for the second customer data.

In another embodiment, a predictor manager receives data including: a first schema of first customer data stored by a first system of a first business entity, and a second schema of second customer data stored by a second system of a second business entity. Additionally, the predictor manager applies a secure multi-party computation to the schema to generate output. Further, the predictor manager uses the output to generate an artificial intelligence model, and provides the artificial intelligence model to the first system of the first business entity for execution by the first system on the first customer data to generate a predictor configured to receive input and process the input to predict a classification for the input. In use, the first system of the first business entity distributes the predictor for use by the second system of the second business entity to predict at least one classification for the second customer data.

DETAILED DESCRIPTION

Figure 1:
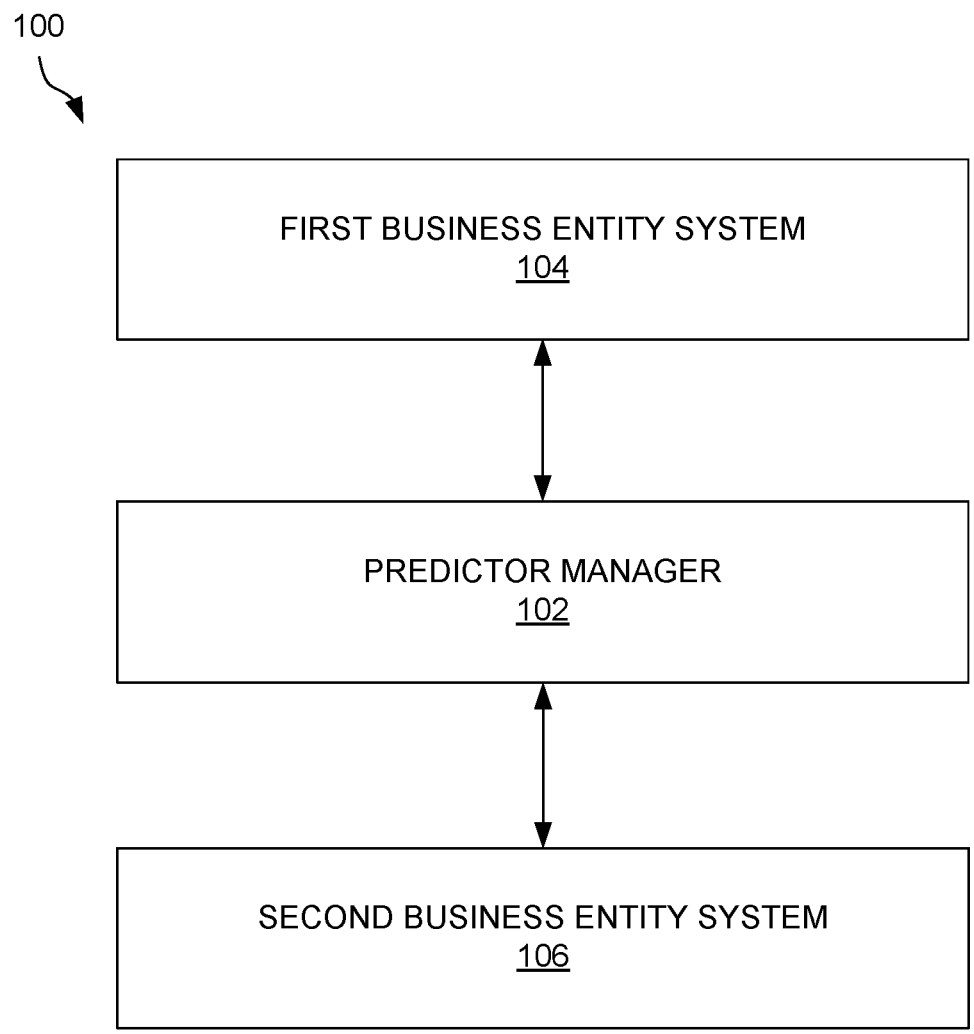
FIG. 1 illustrates a system for using shared customer data and artificial intelligence to predict customer classifications, in accordance with one embodiment.

FIG. 1 illustrates a system 100 for using shared customer data and artificial intelligence to predict customer classifications, in accordance with one embodiment.

As shown, the system 100 includes multiple components, including a predictor manager 102, a first business entity system 104 (also referred to hereinbelow as a "first system of a first business entity"), and a second business entity system 106 (also referred to hereinbelow as a "second system of a second business entity"). The components may each be implemented as a combination of hardware and software. For example, the components may be any of the computer systems described below with reference to FIGS. 6 and/or 7. To this end, the predictor manager 102 may be a third-party system to the first business entity system 104 and the second business entity system 106. In another embodiment, the predictor manager 102 may be a sub-system of the first business entity system 104.

As also shown, the components are in communication with one another. In one embodiment, the components may be in communication with one another via a network. While the first business entity system 104 and the second business entity system 106 are each in communication with predictor manager 102, as shown, it is also an option that the first business entity system 104 and the second business entity system 106 be in communication with one another (not shown).

It should be noted that while only two business entity systems are shown in the present embodiment, other embodiments are contemplated where the system 100 operates similarly with respect to any number of different business entity systems. The functionality of the components of the system 100 is set forth below. Additionally, exemplary embodiments of the functionality of the components of the system 100 are provided in more detail below with respect to FIGS. 2-5.

The first business entity system 104 and the second business entity system 106 are systems 104, 106 of different business entities. The business entities may be in the same line of business or similar lines of business. The business entities may be competitors or business entities in a common supply chain. In any case, the business entities, at least to some extent, desire to share information related to customers.

The first business entity system 104 stores first customer data. The first customer data is data for a first set of customers of the first business entity. The second business entity system 106 stores second customer data. The second customer data is data for a second set of customers of the second business entity. The first set of customers may or may not overlap with the second set of customers. Furthermore, the types of data in the first customer data may or may not be the same as the types of data in the second customer data. Even further, the schema (e.g. database schema, including fields) according to which the first customer data is stored may or may not be the same as the schema according to which the second customer data is stored. The customer data, whether referring to the first or second customer data, may be stored by the respective business entities in the context of their normal course of business.

In one embodiment, the customer data, whether referring to the first or second customer data, may include demographic information for customers. The demographic inform may include location, age, salary, gender, an indication of car ownership, an indication of cellular phone ownership, a marriage status, an indication of any kids, an indication of a preference to travel, a type of house owned or rented, etc. In addition, the customer data, whether referring to the first or second customer data, may also include proprietary information generated by the business entities, respectively. The proprietary information may be classifications for the customers, which may be generated by the business entities based on interactions between the business entities and their customers. In various example, the proprietary information may indicate products and/or services of interest to the customer, an indication of whether the customer pays bills on time, content (e.g. television shows) that the customer is interested in, a temperament of the customer (e.g. often complains, is loyal, etc.), etc.

The predictor manager 102 is configured to include a function for a secure multi-party computation. The secure multi-party computation is applied to the scheme of the first customer data and the schema of the second customer data to produce output. The output may be an intersection of the first customer data schema and the second customer data schema. In general, the secure multi-party computation jointly cryptographically computes a function over the inputs of the different business entities while keeping those inputs private (i.e. while not sharing those inputs between the business entities).

The predictor manager 102 is further configured to generate an artificial intelligence model using the output of the secure multi-party computation (e.g. the intersected data between the first customer data and the second customer data). The artificial intelligence model is configured to process input to create a predictor capable of predicting classifications from customer data. For example, the artificial intelligence model may be configured to receive as input a schema, customer data, and customer classifications, and then process that input to create the predictor capable of predicting classifications from customer data.

The artificial intelligence model, once generated, is then provided by the predictor manager 102 to the first business entity system 104. The first business entity system 104 executes the artificial intelligence model on the first customer data stored by the first system 104 to generate a predictor configured to receive input and process the input to predict a classification for the input. The first business entity system 104 further distributes the predictor for use by the second business entity system 106 to predict at least one classification for the second customer data.

It should be noted that the system 100 may also operate in the opposite direction. In other words, the artificial intelligence model, once generated, may alternatively, or additionally, be provided by the predictor manager 102 to the second business entity system 106. The second business entity system 106 may then execute the artificial intelligence model on the second customer data stored by the second system 106 to generate a second predictor configured to receive input and process the input to predict a classification for the input. The second business entity system 106 may further distribute the predictor for use by the first business entity system 104 to predict at least one classification for the first customer data.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
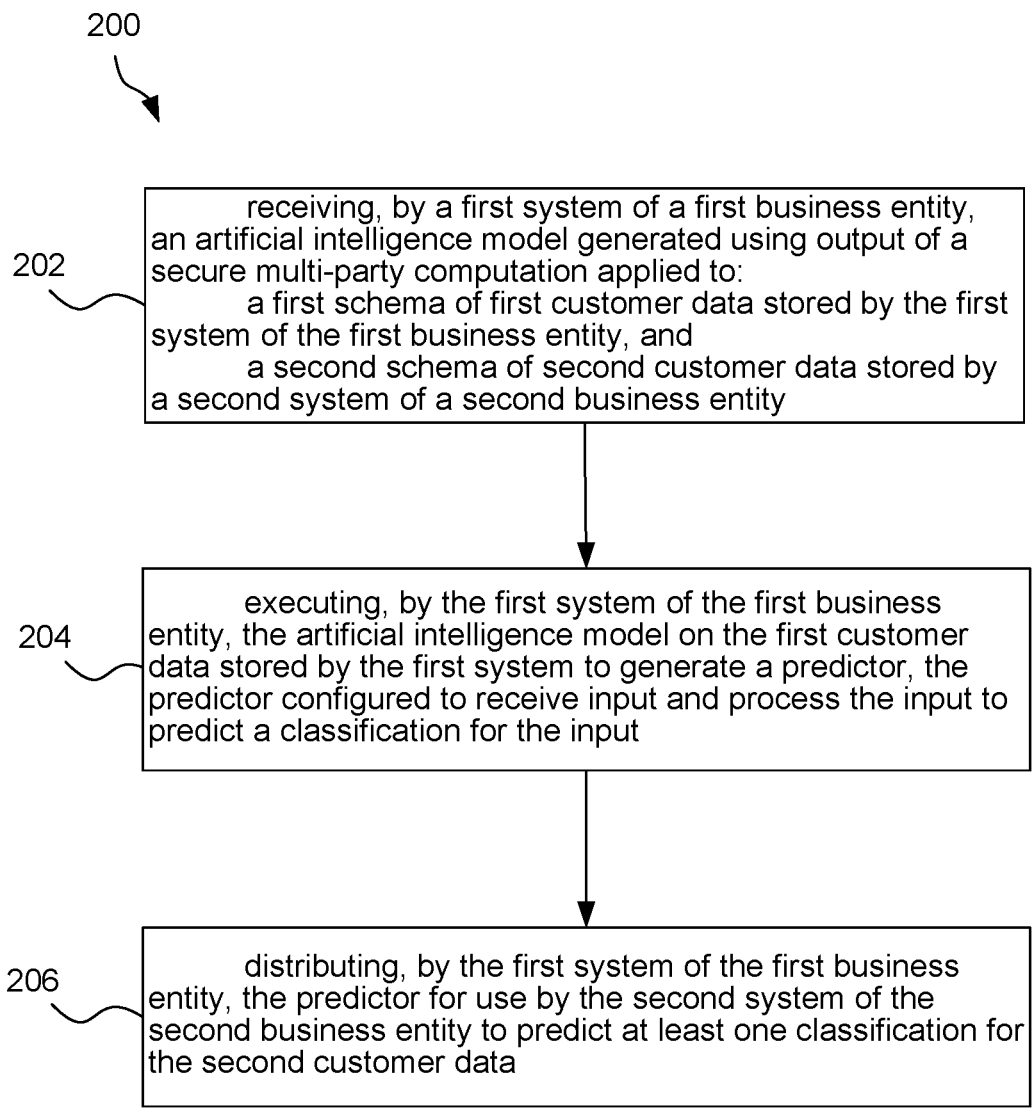
FIG. 2 illustrates a method of the first system of the first business entity of FIG. 1 for generating a predictor, in accordance with one embodiment.

FIG. 2 illustrates a method 200 of the first system 104 of the first business entity of FIG. 1 for generating a predictor, in accordance with one embodiment.

In operation 202, the first system 104 of the first business entity receives an artificial intelligence model generated using output of a secure multi-party computation applied to: a first schema of first customer data stored by the first system of the first business entity, and a second schema of second customer data stored by a second system of a second business entity. The artificial intelligence model may be generated by, and thus received from, the predictor manager 102 of FIG. 1. In an embodiment, the secure multi-party computation may also be applied by the predictor manager 102 of FIG. 1.

Additionally, in operation 204, the first system 104 of the first business entity executes the artificial intelligence model on the first customer data stored by the first system to generate a predictor. In the context of the present operation 204, the predictor that is generated is configured to receive input and process the input to predict a classification for the input.

Further, in operation 206, the first system 104 of the first business entity distributes the predictor for use by the second system 106 of the second business entity to predict at least one classification for the second customer data. In one embodiment, the predictor may be distributed to the second system 106 of the second business entity through the predictor manager 102, for example as described below with reference to FIG. 4. In another embodiment, the predictor may be distributed to the second system 106 of the second business entity directly from the first system 104 of the first business entity, for example as described below with reference to FIG. 3.

Figure 3:
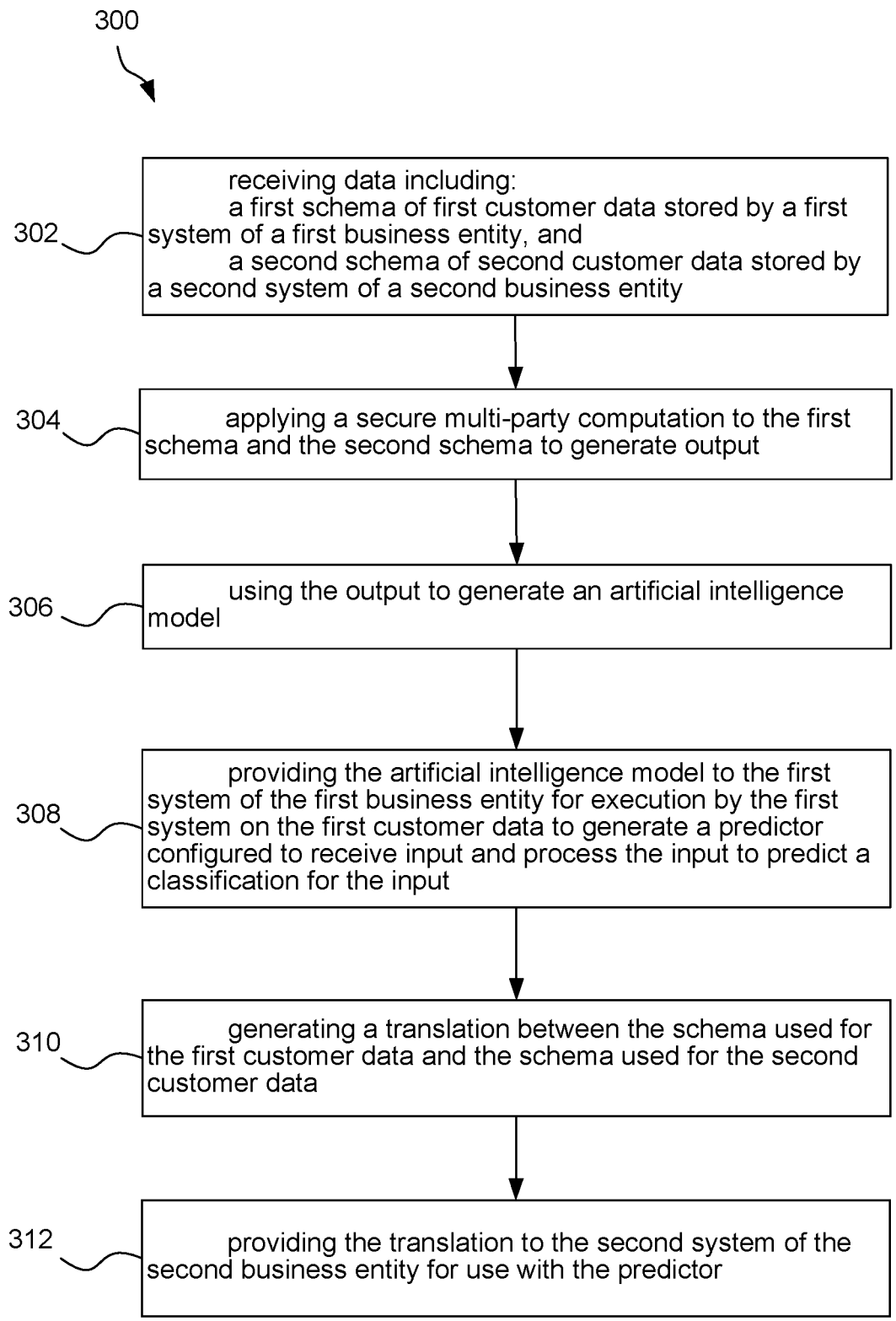
FIG. 3 illustrates a method of the predictor manager of FIG. 1 to generate an artificial intelligence model for the first business entity and a translator for the second business entity, in accordance with one embodiment.

FIG. 3 illustrates a method 300 of the predictor manager 102 of FIG. 1 to generate an artificial intelligence model for the first business entity and a translator for the second business entity, in accordance with one embodiment.

As shown in operation 302, a schema is received for the first customer data stored by the first system 104 of the first business entity, and a schema is received for the second customer data stored by the second system 106 of a second business entity.

Additionally, in operation 304, a secure multi-party computation is applied to the schemas to generate output. In one embodiment, the output may be an intersection of the first customer data schema and the second customer data schema. For example, the output may include a subset schema that is common to both the first customer data schema and the second customer data schema.

Further, in operation 306, the output is used to generate an artificial intelligence model. For example, artificial intelligence (e.g. machine learning, etc.) may be applied to the output to generate the artificial intelligence model.

In operation 308, the artificial intelligence model is provided to the first system 104 of the first business entity for execution by the first system 104 on the first customer data. Such execution by the first system 104 will in turn generate a predictor configured to receive input and process the input to predict a classification for the input. In the context of the system 100 of FIG. 1, the first system 104 of the first business entity may then distribute the predictor for use by the second system 106 of the second business entity to predict at least one classification for the second customer data.

Further, in operation 310, a translation between the schema used for the first customer data and the schema used for the second customer data is generated. The translation may map the first customer data schema to the second customer data schema, in one embodiment.

In operation 312, the translation is provided to the second system 106 of the second business entity for use with the predictor. In this way, the second system 106 may use the predictor in combination with the translation to predict the at least one classification for the second customer data. For example, while the predictor may be generated by the first system 104 according to the schema of the first customer data, this predictor may still be usable by the second system 106 which may have a different schema for the second customer data, through use of the translation.

Figure 4:
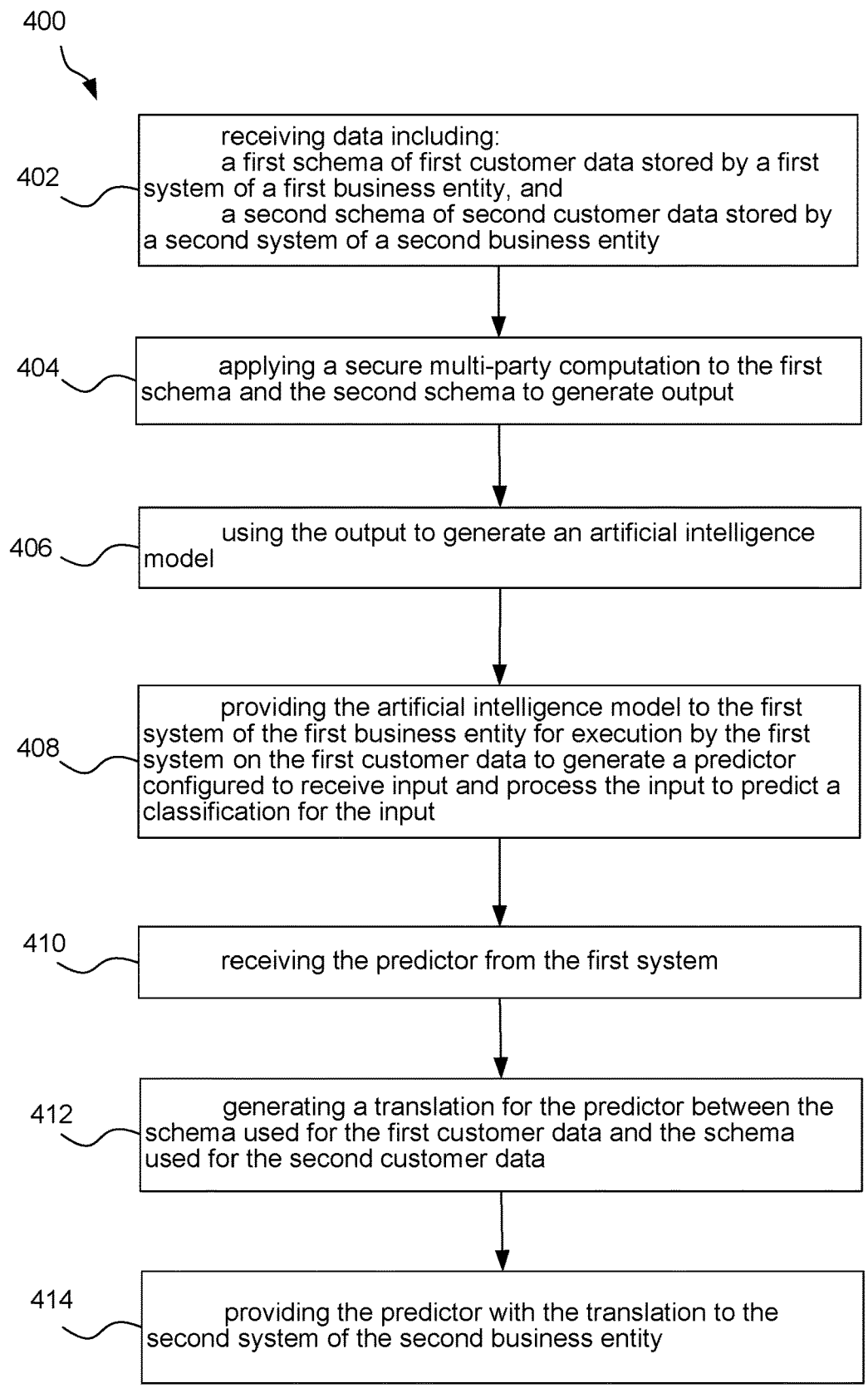
FIG. 4 illustrates a method of the predictor manager of FIG. 1 for managing a predictor generated by the first business entity for distribution to the second business entity, in accordance with one embodiment.

FIG. 4 illustrates a method 400 of the predictor manager 102 of FIG. 1 for managing a predictor generated by the first business entity for distribution to the second business entity, in accordance with one embodiment.

Operations 402-408 may be performed in the same manner as described above with respect to operations 302-308 of FIG. 3. However, following operation 408, the predictor may be received from the first system 104, as shown in operation 410.

In operation 412, a translation is generated for the predictor between the schema used for the first customer data and the schema used for the second customer data. The translation may be similar to the translation described above with respect to operation 310 of FIG. 3.

Further, in operation 414, the predictor is provided with the translation to the second system 106 of the second business entity. In one embodiment, the predictor and translation may be provided to the second system 106 separately. In another embodiment, the predictor may be modified based on the translation, and then the modified predictor may be provided to the second system 106 of the second business entity. This may keep the original predictor generated by the first system 104 private from the second system 106.

Figure 5:
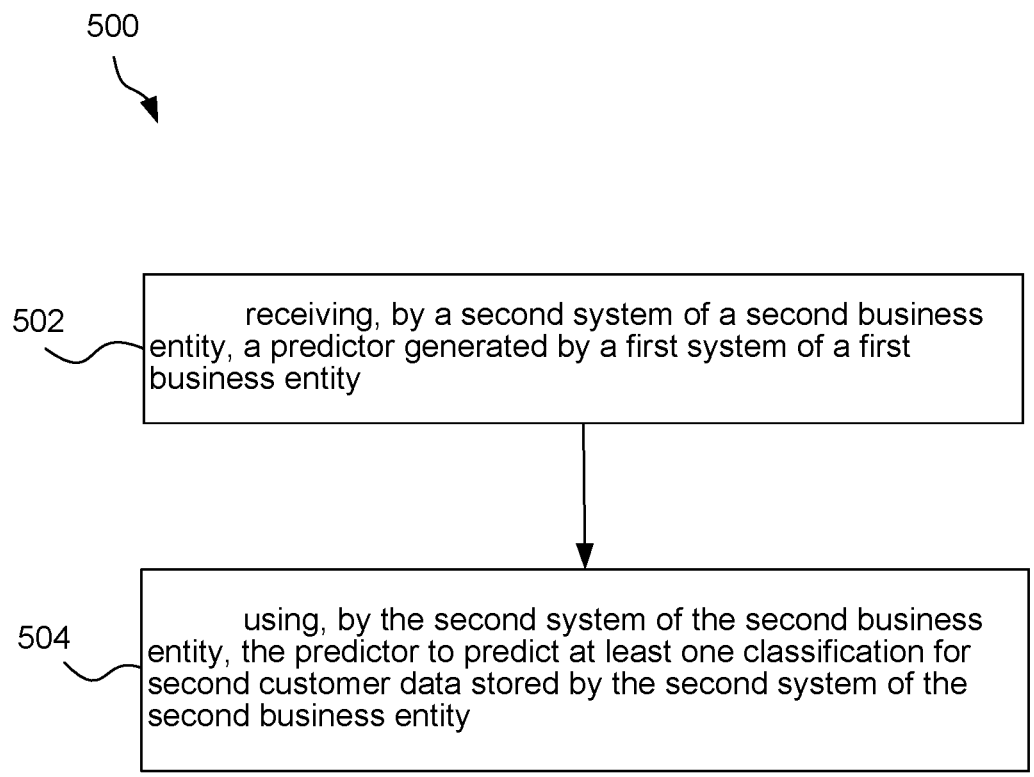
FIG. 5 illustrates a method of the second system of the second business entity of FIG. 1 for executing the predictor, in accordance with one embodiment.

FIG. 5 illustrates a method 500 of the second system 106 of the second business entity of FIG. 1 for executing the predictor, in accordance with one embodiment.

As shown in operation 502, the predictor generated by the first system 104 is received. The predictor may be received directly from the first system 104 (e.g. as described in FIG. 3) or may be received from the predictor manager 102 (e.g. described in FIG. 4).

Additionally, in operation 504, the predictor is used to predict at least one classification for the second customer data stored by the second system 106. For example, the second customer data may be input to the predictor, which in turn may output the classification(s) for the second customer data.

Exemplary Use-Case Scenario

Assume two clients, A and B. A knows, for its own clients, if they like fancy cars (as an example) because it sells cars. B would like to advertise fancy cars to its customers, but does not know which of them to advertise to. Sending advertising to all customers is both expansive and annoying to the customers.

So, B is in another business but wants to leverage its customers. It would like to learn from A which of B's customers are likely to buy what kind of cars. A is willing to share this information, but has to protect the customers' privacy as well as its own data.

The system 100 of FIG. 1 may be leveraged as a solution to this scenario. Let A' be the data fields A knows on its customers. This may be, for example, 27 fields including age, gender, location, education, citizenship, etc. Let B' be the data fields B knows on its customers. This may be, for example, 40 fields, some in common with A' and some different.

Using a secure multi-party computation, the intersection of the fields of A' and B' is computed. An artificial intelligence model is created for A to run on its customer data that uses just fields in the intersection of A' and B'. The artificial intelligence model knows the schema, so it knows all the fields but it uses only the fields in the intersection to classify. This artificial intelligence model classifies customers of A according to if they like fancy cars (something A knows about its customers). The result of the artificial intelligence model is a predictor.

It is important to note that in order to create this model, A and B did not share data, nor what fields they have. The secure multi-party computation is used to figure out the fields A and B have in common. The output of the multi-party computation is input to the model creation, which also knows the schema of A, and creates a model that A runs on its customer data.

Once the model is run, its output is a predictor. The predictor looks at all the fields of A but uses only those in the intersection. Let's call this predictor Fancy(A-scheme, (A' union B')). This predictor, on the scheme of A, taking only A' union B' makes predictions on interest in fancy cars.

Now when this predictor is sent to B, another predictor can be created: Fancy(B-scheme, (A' union B')). B run Fancy(B-scheme, (A' union B')) on its data. The model when executed at B receives all the data B' has. On some of B's customers, the predictor Fancy(B-scheme, (A' union B')) will advise advertising for fancy cars.

Notice that B could have not learned it on its own, simply because B does not know what its customers think about fancy cars and so can't determine this classification. No data was shared between A and B. The predictor created does not contain data on any individual customers.

B, on the other hand, knows which of its customers buy sport channels. It runs the model to learn it, and then creates a predictor Sport(B-schema,(A' union B')). B can provide (e.g. sell) this predictor to A, under slight modification to make it fit A's schema. A can then run it to classify its customers, and can advertise sport channels to its customers based on the classifications.

So in general, any two business entities can share some information in this way, and get useful actionable models from each other. Since the model runs on the business entity's own data, no customer data is shared between business entities, only the models are shared.

Figure 6:
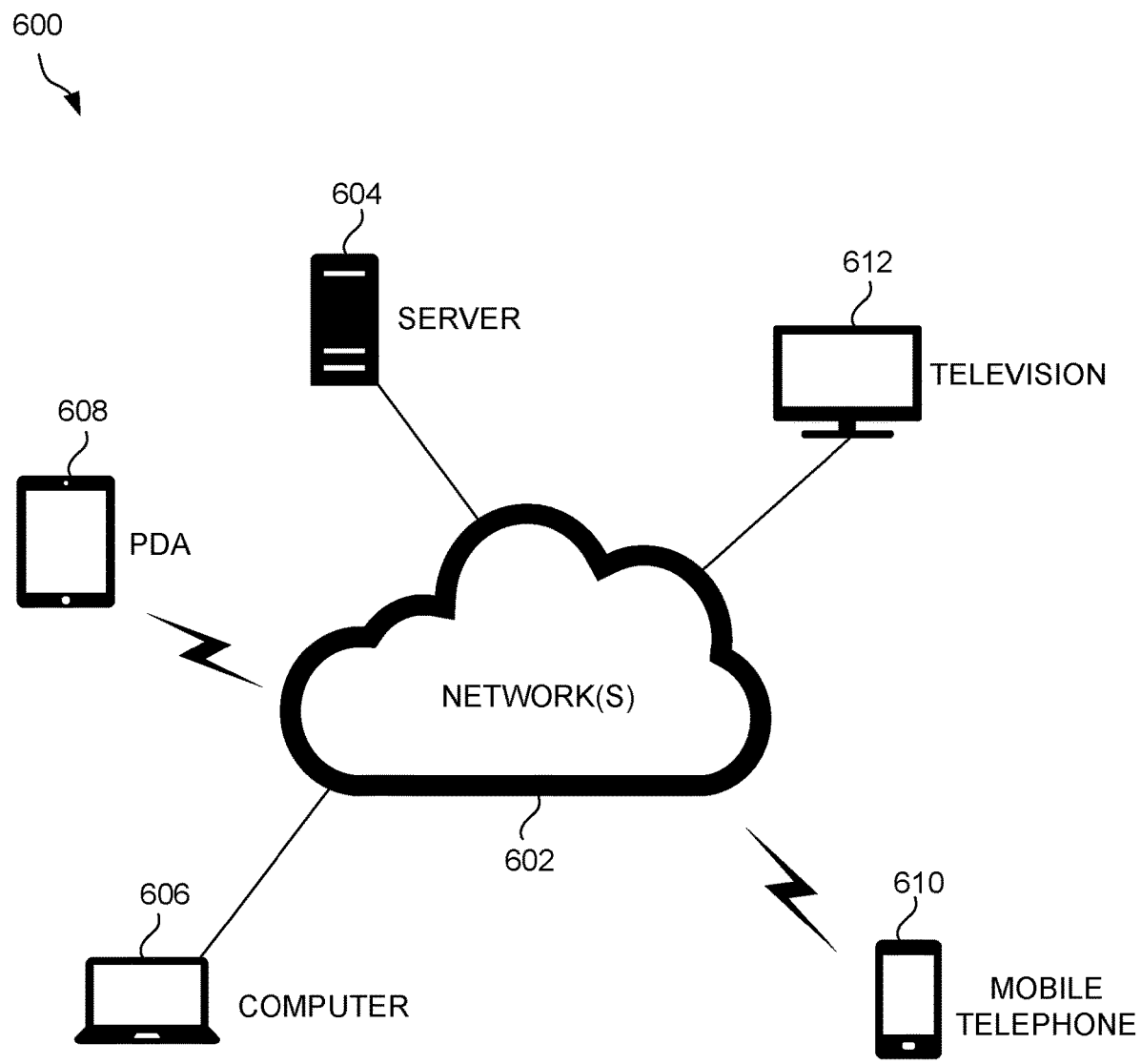
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
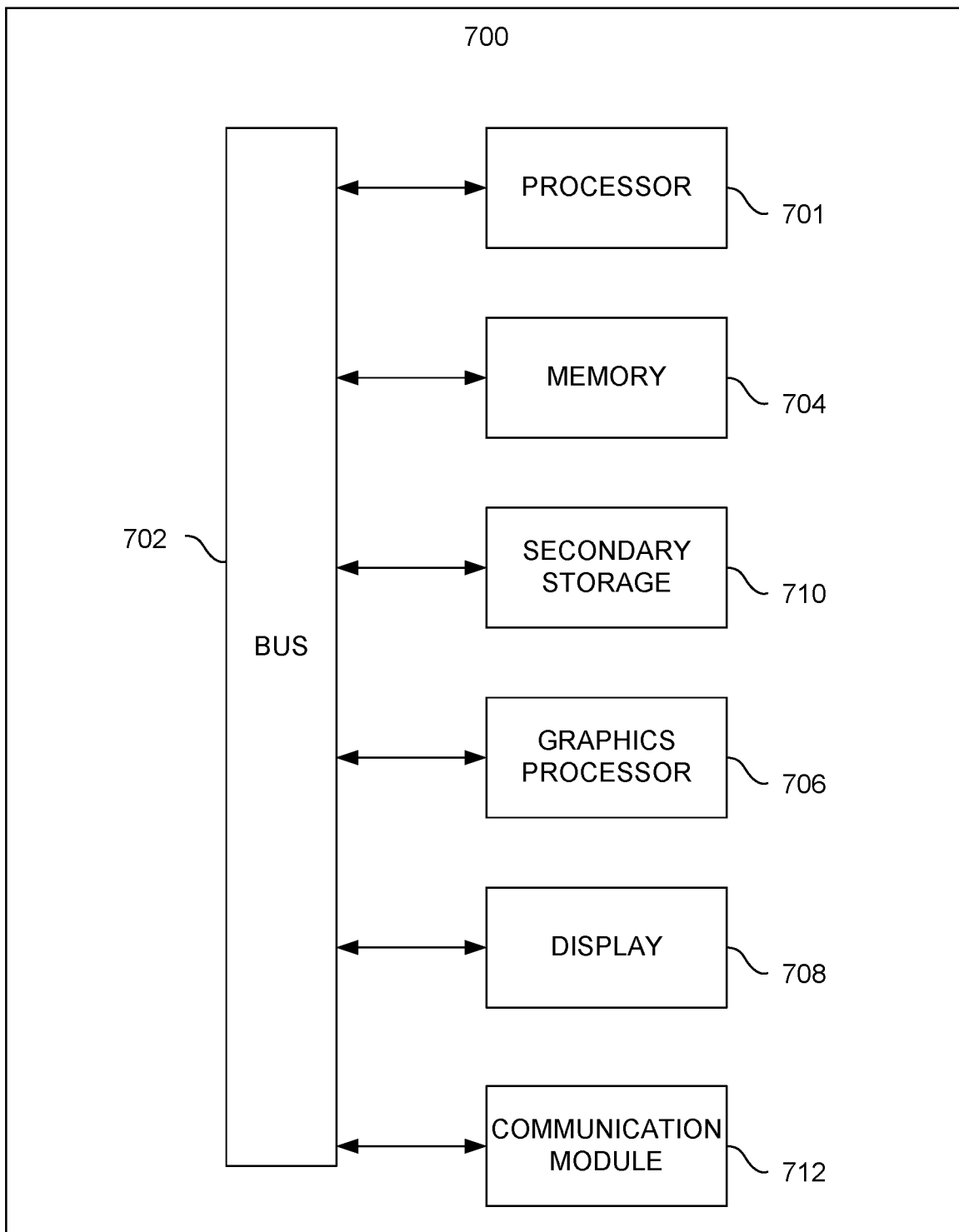
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

The system 700 may also include one or more communication modules 712. The communication module 712 may be operable to facilitate communication between the system 700 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
receiving, by a first system of a first business entity from a third-party system to the first system of the first business entity and a second system of a second business entity, an artificial intelligence model configured to process a first input to create a predictor capable of predicting classifications from customer data, wherein the artificial intelligence model is generated using machine learning performed on output of a secure multi-party computation applied to:
a first database schema according to which first customer data is stored in a first database by the first system of the first business entity, and
a second database schema according to which second customer data is stored in a second database by the second system of the second business entity,
wherein the secure multi-party computation is applied by the third-party system to the first system of the first business entity and the second system of the second business entity,
wherein the secure multi-party computation jointly cryptographically computes a function over the first database schema and the second database schema,
wherein the output of the secure multi-party computation is a subset database schema that is common to both the first database schema and the second database schema, and
wherein the artificial intelligence model is generated by the third party system from the output of the secure multi-party computation such that the artificial intelligence model is generated without sharing the first customer data with the second business entity and without sharing the second customer data with the first business entity;
executing, by the first system of the first business entity, the artificial intelligence model on the first schema, the first customer data, and customer classifications to generate a first predictor, the first predictor configured to receive a second input and process the second input to predict a classification for the second input,
wherein the third-party system receives the first predictor from the first system for generating a translation for the first predictor between the first database schema according to which the first customer data is stored and the second database schema according to which the second customer data is stored;
distributing, by the first system of the first business entity through the third party system, the first predictor with the translation to the second system of the second business entity for use by the second system of the second business entity to predict at least one classification for the second customer data.

2. The non-transitory computer readable medium of claim 1, wherein the first customer data includes demographic information for a first set of customers of the first business entity and the second customer data includes demographic information for a second first set of customers of the second business entity.

3. The non-transitory computer readable medium of claim 1, wherein the demographic information includes location, age, salary, and gender.

4. The non-transitory computer readable medium of claim 1, wherein the first customer data includes proprietary information generated by the first business entity for a first set of customers of the first business entity and the second customer data includes proprietary information generated by the second business entity for a second set of customers of the second business entity.

5. The non-transitory computer readable medium of claim 4, wherein the proprietary information includes at least one of products or services of interest.

6. A method, comprising:
receiving, by a first system of a first business entity from a third-party system to the first system of the first business entity and a second system of a second business entity, an artificial intelligence model configured to process a first input to create a predictor capable of predicting classifications from customer data, wherein the artificial intelligence model is generated using machine learning performed on output of a secure multi-party computation applied to:

a first database schema according to which first customer data is stored in a first database by the first system of the first business entity, and a second database schema according to which second customer data is stored in a second database by the second system of the second business entity, wherein the secure multi-party computation is applied by the third-party system to the first system of the first business entity and the second system of the second business entity, wherein the secure multi-party computation jointly cryptographically computes a function over the first database schema and the second database schema, wherein the output of the secure multi-party computation is a subset database schema that is common to both the first database schema and the second database schema, and wherein the artificial intelligence model is generated by the third party system from the output of the secure multi-party computation such that the artificial intelligence model is generated without sharing the first customer data with the second business entity and without sharing the second customer data with the first business entity;

executing, by the first system of the first business entity, the artificial intelligence model on the first schema, the first customer data, and customer classifications to generate a first predictor, the first predictor configured to receive a second input and process the second input to predict a classification for the second input, wherein the third-party system receives the first predictor from the first system for generating a translation for the first predictor between the first database schema according to which the first customer data is stored and the second database schema according to which the second customer data is stored;

distributing, by the first system of the first business entity through the third party system, the first predictor with the translation to the second system of the second business entity for use by the second system of the second business entity to predict at least one classification for the second customer data.

* * * * *